(No Model.)
W. F. SNIVELY.
COVERED DISH.
No. 329,228. Patented Oct. 27, 1885.
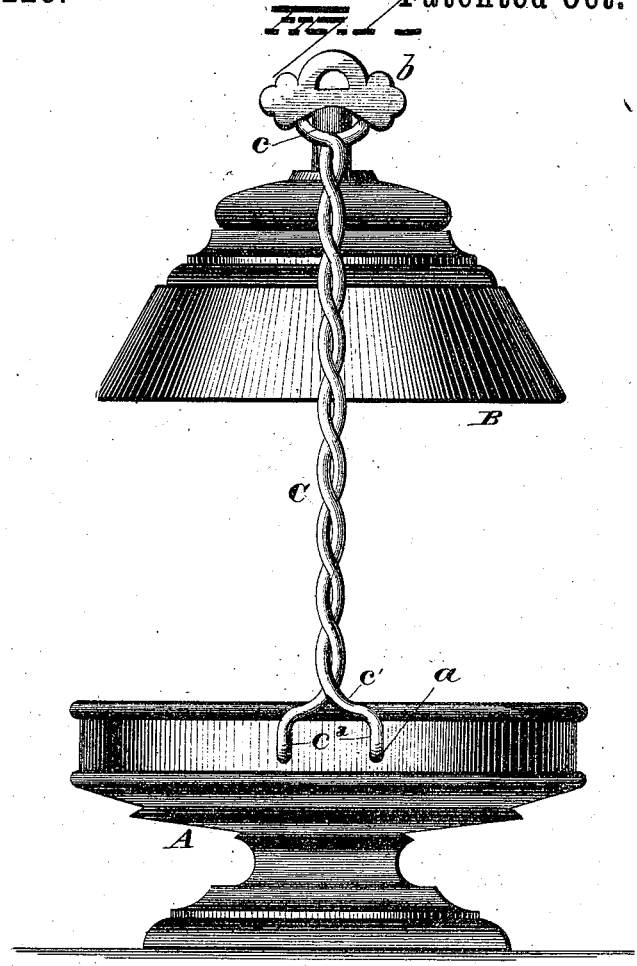
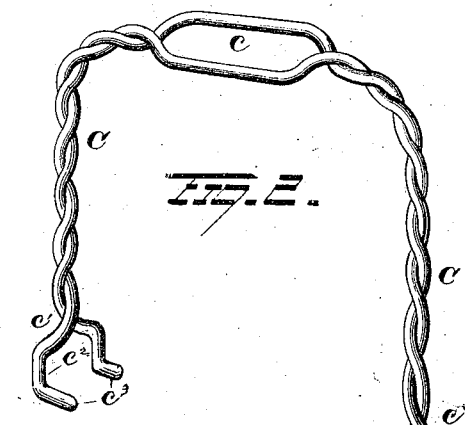
WITNESSES
E. J. Nottingham
Geo. F. Downing
INVENTOR
Wm. F. Snively.
By Leggett & Leggett.
Attorney

UNITED STATES PATENT OFFICE.

WILMER F. SNIVELY, OF BELLAIRE, OHIO.

COVERED DISH.

SPECIFICATION forming part of Letters Patent No. 329,228, dated October 27, 1885.

Application filed January 7, 1885. Serial No. 152,190. (No model.)

*To all whom it may concern:*

Be it known that I, WILMER F. SNIVELY, of Bellaire, in the county of Belmont and State of Ohio, have invented certain new and useful Improvements in Covered Dishes; and I do hereby declare the following to be a full, clear, and exact description of the invention, such as will enable others skilled in the art to which it appertains to make and use the same.

My invention relates to an improvement in covered dishes, the object of the same being to provide a dish with a detachable bail of simple, economical, and durable construction adapted to support the dish-cover in elevated adjustment, a further object being to provide a cover with a knob or handle of neat design adapted to pass through a loop in the bail and hold the cover against liability of displacement; and with these ends in view my invention consists in certain features of construction and combinations of parts, as will be hereinafter described, and pointed out in the claims.

In the accompanying drawings, Figure 1 is a view of the dish with the cover in elevated adjustment, and Fig. 2 is a detached view of the handle.

A represents a dish of any desired pattern, provided with two pairs of sockets, $a$, located diametrically opposite each other in the outer rim of the dish.

B is the cover. It is provided at its top with a spear-shaped knob or handle, $b$.

The bail C consists of two pieces of wire twisted together or soldered or twisted and soldered, as shown, and bent apart at the top, forming an elongated loop, $c$, adapted to receive the handle $b$ when the latter is turned longitudinally therewith. The adjacent ends of the wires which form the bail are first bent away from each other, as shown at $c'$; then extended downwardly parallel, or nearly so, with each other, as shown at $c^2$, and are then bent inwardly, forming the retaining-hooks $c^3$, which are adapted to enter the sockets $a$.

The wire of which the bail C is constructed is spring metal, and the bail is of such shape that the tension of the wire tends to hold the hooks $c^3$ in their sockets, but renders the bail readily detachable for purposes of cleaning, burnishing, &c.

By means of the two wire sections I am enabled to construct a bail of tasteful design, and at the same time provide the forked ends for attaching the bail to the dish, whereby the dish is prevented from tilting while being carried from place to place, as is the case with dishes supported by a single rod detachable bail.

I have mentioned the cover handle or knob as spear-shaped, but do not wish to be understood as limiting myself to that particular style, as a T-shaped handle, or any style of handle longer than it is wide and provided with wings adapted to pass up through the loop $c$ and when turned one-fourth of a revolution rest on the sides of the loop, would fall within the spirit and scope of my invention; but my preferred mode of construction is to provide the wings of the knob or handle with under-cuts, as shown in Fig. 1, which tend to lock the cover against a rotary displacement when in its elevated position.

I am aware that it is not new to provide a dish or jar with a removable bail, and also that it is not new to provide a bail with a bend or loop therein for removably holding the cover of the vessel, and hence I make no claim, broadly, to these constructions; but, Having fully described my invention, what I claim as new, and desire to secure by Letters Patent, is—

1. The combination, with a dish having retaining-sockets on its opposite sides, of a detachable bail consisting of pieces of wire secured together and bent fork shape at the ends for engaging the sockets, substantially as set forth.

2. The combination, with a dish having retaining-sockets on its opposite sides, of a detachable spring-metal bail provided at its opposite ends with fork-shaped projections for entering the sockets in the dish, and provided centrally with an elongated closed loop, and a knob or handle on the cover adapted to pass through said closed loop and lock the cover in an elevated position.

3. The combination, with a dish and its cover, of a wire bail consisting of pieces of wire secured together and detachably secured to the dish, the wire sections of the bail being separated at the top to form an elongated loop adapted to receive a knob on the cover, substantially as set forth.

4. The combination, with a dish and its cover and a detachable bail provided with an elongated loop at its top, of a cover-handle adapted to pass through the loop, and provided with undercut wings for locking the cover to the bail in elevated adjustment, substantially as set forth.

In testimony whereof I have signed this specification in the presence of two subscribing witnesses.

WILMER F. SNIVELY.

Witnesses:
OLIVER T. BORHAM,
JAMES C. TALLMAN.